Patented Aug. 27, 1940

2,212,629

UNITED STATES PATENT OFFICE 2,212,629

METHOD OF PREPARING COMPOSITE PIGMENTS

Hugh V. Alessandroni, New York, N. Y., assignor to National Lead Company, New York, N. Y., a corporation of New Jersey No Drawing. Application November 23, 1938, Serial No. 241,949

12 Claims. (Cl. 134—58)

My invention relates to novel methods for the manufacture of pigments, particularly to the manufacture of that type of pigment known as "composite" in which a primary pigment is intimately associated with one or more secondary pigments. More particularly, my invention relates to the manufacture of those composite pigments which contain titanium compounds such as titanium dioxide or metallic titanates.

The objects of my invention include novel methods for the manufacture of composite pigments which methods possess many advantages over those of the prior art.

The terms "primary pigment" and "secondary pigment" as used herein are intended to have the following meaning: "Primary pigment" in a composite pigment prepared according to the present invention is that component which possesses the highest tinting strength, hiding power and opacity, whereas the "secondary pigment" is to be regarded as the component or components which possess tinting strength, hiding power and opacity to a lesser degree than does the component of the composite pigment possessing these properties in the higher degree. Thus, for example, in a composite pigment prepared according to the invention in which titanium dioxide is associated with zinc sulfide, the titanium dioxide is to be regarded as the primary pigment and the zinc sulfide as the secondary pigment. If, however, zinc sulfide is to be associated with barium sulfate, then the zinc sulfide is to be regarded as the primary pigment and the barium sulfate as the secondary pigment.

Prior to my investigation of composite pigments, these pigmentary compositions were prepared principally by methods involving a coprecipitation of the pigmentary components, forming one or more of these components in the presence of the other in a precipitation mixture, followed by a conjoint calcination. For example, composite titanium pigments were prepared by suspending an extender pigment such as barium sulfate, calcium sulfate and the like, in a hydrolyzable titanium salt solution, heating this solution to precipitate a mixture of hydrous titanium oxide and extender pigment. This mixture was then subsequently calcined to develop optimum pigmentary properties of the titanium dioxide. The composite zinc sulfide-barium sulfate pigment known as lithopone was prepared by a coprecipitation wherein zinc sulfide and barium sulfate were formed as a result of a double decomposition reaction between solutions of zinc sulfide and of barium sulfate. The precipitated mixture was subsequently calcined to develop the pigment properties of the zinc sulfide. Such procedures involved the disadvantage of handling large amounts of materials, i. e., the extender pigments, which were not improved by any of the subsequent treatments of the process, consequently a great expense was involved in the installation of larger equipment than necessary as well as in the heat-treatment of the larger volume of extender pigment, the properties of which were not enhanced by the heat-treatment.

Another accepted method of manufacturing the composite pigments has been to mix, by blending as an aqueous slurry, a calcined titanium dioxide pigment with an extender or secondary pigment and calcining the two together. This has the disadvantage of subjecting the titanium dioxide to a second calcination after all pigment properties have already been developed in its initial preparation.

In recent times a method for preparing composite titanium pigments has been proposed which involved the selection of the pigmentary components, i. e., the titanium dioxide and the extender pigment of proper particle size so that when these components are intimately, mechanically mixed a composite pigment results having pigmentary properties at least equal to a similar composite titanium dioxide pigment prepared by coprecipitation and conjoint calcination methods. This procedure is based upon the discovery that the tinting strength, hiding power and other pigment properties of composite pigments in a large measure depend upon the uniformity of particle size of the components within certain definite ranges of particle size and the intimacy of mixture of these components.

In my co-pending applications Serial No. 37,775, filed August 24, 1935, No. 239,511, filed November 8, 1938, and No. 239,512, filed November 8, 1938, I have described and claimed new and improved methods for making composite pigments. The methods as described in my copending applications involve the dispersing of a primary pigment in aqueous suspension using a small amount of a suitable dispersing agent, separately dispersing one or more secondary pigments in aqueous suspension using suitable dispersion agents, and mixing these separately-prepared dispersions. Coflocculation of the composite pigment, according to the methods described in my copending applications, may be accomplished in one of two ways: (a) by the addition to the mixed dispersions of a coagulating agent, or (b) by selecting the dispersing agents so that the dispersing agents for the primary and secondary pigments will be antipathetic to each other. By antipathetic is meant that the dispersing agents will have a mutually neutralizing, or nullifying action, one upon the other so that co-precipitation of the composite pigment results simply by mixing the separately prepared suspensions.

The methods as described in my co-pending applications represent a major advance in the art of making composite pigments because, first, they obviate the necessity of handling large quantities of inert pigment materials during the initial stages of composite pigment manufacture as practised in the art and second, they render unnecessary the previous treatment of the primary and secondary pigments to obtain particles of proper particle size and uniformity. Methods for selection of pigments of particle size involve elaborate and costly treatments, such as milling followed by an air- or hydro-separation, whereas according to the methods described in my co-pending applications no such treatments are necessary. The methods described in my aforementioned co-pending applications as well as the methods described in the present application are based upon the fact that dispersing agents act upon pigmentary materials to break down the aggregates, or secondary particles, into the individual, or primary particles. Since calcination of pigmentary substances as well as certain milling methods increase the secondary particle size by aggregating together a number of primary particles, it is essential that these aggregates be broken down before the pigment materials are suitable for the preparation of composite pigments. According to my discovery, a dispersing agent accomplishes this separation and consequently reduces the particle size to the proper degree and uniformity to render the pigment material suitable for the preparation of composite pigments. The use of dispersing agents, according to my inventions, obviates the necessity for the involved methods of the prior art for breaking down aggregates into primary particles of proper size and uniformity prior to the preparation of the composite pigment.

I have now discovered that it is possible to prepare composite pigments by intimately mixing by any suitable mixing methods aggregated primary and secondary pigments, dispersing this mixture by means of a dispersing agent, thereby to break down the aggregated particles into their individual, primary particles and then coflocculating the dispersion of the individual particles of primary and secondary pigment by adding a coagulating agent.

Among the materials which exert a dispersing effect on various primary and secondary pigments and which are, therefore, useful in the practice of my invention may be mentioned: The carbonates and hydroxides of alkali metals, e. g., NaOH, Na$_2$CO$_3$; ammonium hydroxide, NH$_4$OH; alkali metal silicates, e. g., Na$_2$SiO$_3$; sulfides, e. g., H$_2$S; certain inorganic salts, e. g., PbCl$_2$ and BaCl$_2$; acidic halides of tri- and tetravalent elements, e. g., those of Fe, Th, Tl, Ce, Al, Ti, Zr, etc.; metallic soaps, e. g., those of oleic, stearic, palmitic or lauric acid; the ammonium soaps of sulfonated aliphatic oils, e. g., the ammonium soap of sulfonated castor oil; sulfonated fatty oils or acids, e. g., Turkey red oil; alkyl- substituted aryl sulfonic acids and their salts, e. g., isopropylnaphthalene sulfonic acid and the sodium salt thereof; certain emulsifying agents such as saponin, trihydroxyethylamine, etc.; proteinaceous compounds, e. g., casein, amino compounds, e. g., hexamethylenetetramine; etc.

The group of dispersing agents given above are primarily substances of an alkaline nature and in the selection of a proper coagulating agent this fact should be borne in mind. When the dispersing agent is of an alkaline nature, acidic substances such as sulfuric, hydrochloric acid, acid-reacting salts and the like are best employed as the coagulating agent. The function of the coagulating agent should be to neutralize or nullify the stabilizing influence of the dispersing agent used for dispersing the mixture of primary and secondary pigments. Inorganic salts which are electrolytes may act in this manner. Such electrolytes may be considered as furnishing in solution two types of ions: (a) One which may be adsorbed by pigment particles and thus cause dispersion, and (b) One which tends to neutralize or discharge the dispersing effect and cause the flocculation. When the dispersed pigment particles are coflocculated from dispersions by means of a coagulating agent which is an electrolyte the flocculating power of that electrolyte may be considered as in inverse ratio to that minimum amount which furnishes a sufficient quantity of those ions which tend to neutralize not only the original stabilizing influences of the dispersing agent but also those of the electrolyte itself. Magnesium sulfate for example, is a coagulating agent of high flocculating power, i. e., relatively small amounts at low concentration are effective coagulants.

The quantity of dispersing agent necessary to disperse the mixed, aggregated pigments may vary between about two-tenths percent and about 5.0 percent, based upon the combined weight of pigments to be dispersed. The quantity of coagulating agent must, of course, be adequate to completely neutralize the effects of the dispersing agent. The quantity of coagulating agent is readily controlled by pouring aqueous solutions of the coagulating agent into the dispersion of the pigment particles until the pigment particles are completely coflocculated, which point is readily observable visually.

The preparation of the dispersion of the aggregated, mixed pigment particles will present no difficulty to those skilled in the art. If desired, the aggregated primary and secondary pigments may be mixed dry and then vigorously agitated in water containing a proper amount of dispersing agent. On the other hand, the dispersion and mixing may take place simultaneously, e. g., by intimately mixing, as by ball milling, the raw material primary and secondary pigments with the water and dispersing agent. The dispersion of mixed primary and secondary pigments may then be coagulated directly or, if desired, may first be hydroseparated and the fines in the overflow coagulated by the addition of an appropriate coagulating agent. The so-produced composite pigment is then dewatered and dried.

The following examples are given purely for illustrative purposes to instruct those skilled in the art in the proper manner of practicing my invention but no undue limitations are to be construed therefrom.

EXAMPLE I

Titanium dioxide-barium sulfate composite pigment 100 kilograms of titanium dioxide pigment and 300 kilograms of barium sulfate, either natural barytes or blanc fixe, are intimately and uniformly mixed in a suitable mixing device, such as a pebble mill, with 300 gallons of water containing 3.0 kilograms of sodium pyrophosphate, $Na_4P_2O_7$ the pigmentary mixture thus dispersed is then passed through a hydro-separator, the underflow which contains some undispersed pigment aggregates is returned to the pebble mill through a separate pass. The overflow containing the dispersed pigment particles is fed to a suitable tank and the pigment particles flocculated by the addition of 40 kilograms of a 10 percent solution of magnesium sulfate. The coflocculated pigment particles are separated from the supernatant liquor, washed and dried, preferably at temperatures between 100° and 120° C. After drying the composite pigment is easily disintegrated.

The pigment thus prepared is a composite pigment consisting of approximately 25 parts of titanium dioxide and 75 parts of barium sulfate. It possesses tinting strength, hiding power, color and brightness equal to composite pigments prepared by prior art methods and a somewhat more uniform and smoother texture.

EXAMPLE II

Titanium dioxide-calcium sulfate composite pigment 150 kilograms of titanium dioxide and 350 kilograms of calcium sulfate either ground, dehydrated natural gypsum or synthetically prepared anhydrite, are intimately and uniformly mixed in a pebble mill with about 400 gallons of water containing 25 kilograms of casein which acts as a dispersing agent for both the titanium dioxide and calcium sulfate.

The dispersed suspension of pigment particles is then fed to a suitable tank and coagulated directly by the addition of sulfuric acid. The coflocculated composite pigment is then dewatered, washed, and dried. Ground natural gypsum or a precipitated gypsum containing water of hydration may be used in the practice of my invention as illustrated by this example, but when this material is employed the final drying should be carried out at about 500° C. in order to remove the water of hydration contained in the gypsum. After drying the composite pigment is disintegrated. There is thus obtained a composite pigment consisting of about 30% of titanium dioxide and 70% of calcium sulfate. It possesses tinting strength, hiding power, color and brightness as good as any composite pigment of similar composition prepared by the prior art methods. Its texture and uniformity of paint is better.

EXAMPLE III

Preparation of synthetic lithopone 100 kilograms of commercial zinc sulfide and 233 kilograms of finely divided barium sulfate are intimately and uniformly mixed by milling together with about 290 liters of water containing 2 kilograms of sodium silicate.

The dispersed suspension is collected in a suitable tank and flocculated directly by acidifying the suspension with sulfuric acid to a pH value of about 6. The coflocculated pigment is dewatered, washed and dried, and thereafter disintegrated.

The resulting product is a pigment consisting of about 30% zinc sulfide and 70% barium sulfate. It possesses tinting strength, hiding power, color and brightness similar to lithopone prepared by prior art methods; its uniformity of particle sizes and texture is improved.

The foregoing description has been given for clearness of understanding and no undue limitations should be deduced therefrom but the appended claims should be construed as broadly as possible in view of the prior art.

I claim:

1. Method for the preparation of composite pigments which comprises mixing aggregated particles of primary pigment with those of secondary pigment in a single aqueous medium while simultaneously dispersing the said particles in the said medium by means of a small amount of a single dispersing agent, adding to the resultant dispersion of substantially non-aggregated pigment particles a coagulating agent, separating the coflocculated composite pigment from the dispersion medium and washing, drying and disintegrating the same.

2. Method for the preparation of a composite titanium dioxide pigment which comprises mixing aggregated particles of titanium dioxide with those of a secondary pigment in a single aqueous medium while simultaneously dispersing the said particles in the said medium by means of a small amount of a single dispersing agent, adding to the resultant dispersion of substantially non-aggregated pigment particles a coagulating agent, separating the coflocculated composite titanium dioxide pigment from the dispersion medium and washing, drying and disintegrating the same.

3. Method for the preparation of a composite titanium dioxide-barium sulfate pigment which comprises mixing aggregated particles of titanium dioxide with those of barium sulfate in a single aqueous medium while simultaneously dispersing the said particles in the said medium by means of a small amount of a single dispersing agent, adding to the resultant dispersion of substantially non-aggregated pigment particles a coagulating agent, separating the coflocculated composite titanium dioxide-barium sulfate pigment from the dispersion medium, and washing, drying and disintegrating the same.

4. Method for the preparation of a composite titanium dioxide-calcium sulfate pigment which comprises mixing aggregated particles of titanium dioxide with those of calcium sulfate in a single aqueous medium while simultaneously dispersing the said particles in the said medium by means of a small amount of a single dispersing agent, adding to the resultant dispersion of substantially non-aggregated pigment particles a coagulating agent, separating the coflocculated composite titanium dioxid-calcium sulfate pigment from the dispersion medium, and washing, drying and disintegrating the same.

5. Method for the preparation of a composite zinc sulfide pigment which comprises mixing aggregated particles of zinc sulfide with those of a secondary pigment in a single aqueous medium while simultaneously dispersing the said particles in the said medium by means of a small amount of a single dispersing agent, adding to the resultant dispersion of substantially non-aggregated pigment particles a coagulating agent, separating the coflocculated composite zinc sulfide pigment from the dispersion medium and washing, drying and disintegrating the same.

6. Method for the preparation of a composite zinc sulfide-barium sulfate pigment which comprises mixing aggregated particles of zinc sulfide with those of barium sulfate in a single aqueous medium while simultaneously dispersing the said particles in the said medium by means of a small amount of a single dispersing agent, adding to the resultant dispersion of substantially non-aggregated pigment particles a coagulating agent, separating the coflocculated composite zinc sulfide-barium sulfate pigment from the dispersion medium, and washing, drying and disintegrating the same.

7. Method for the preparation of a composite titanium dioxide-barium sulfate pigment which comprises mixing aggregated particles of titanium dioxide with those of barium sulfate in a single aqueous medium while simultaneously dispersing the said particles in the said medium by means of a small amount of sodium pyrophosphate, adding to the resultant dispersion of substantially non-aggregated pigment particles a small amount of a magnesium sulfate in aqueous solution, separating the coflocculated composite titanium dioxide-barium sulfate pigment from the dispersion medium, and washing, drying and disintegrating the same.

8. Method for the preparation of a composite titanium dioxide-calcium sulfate pigment which comprises mixing aggregated particles of titanium dioxide with those of calcium sulfate in a single aqueous medium while simultaneously dispersing the said particles in the said medium by means of a small amount of casein, adding to the resultant dispersion of substantially non-aggregated pigment particles a small amount of a sulfuric acid, separating the coflocculated composite titanium dioxide-calcium sulfate pigment from the dispersion medium, and washing, drying and disintegrating the same.

9. Method for the preparation of a composite zinc sulfide-barium sulfate pigment which comprises mixing aggregated particles of zinc sulfide with those of barium sulfate in a single aqueous medium while simultaneously dispersing the said particles in the said medium by means of a small amount of sodium silicate, adding to the resultant dispersion of substantially non-aggregated pigment particles a small amount of a sulfuric acid, separating the coflocculated composite zinc sulfide-barium sulfate pigment from the dispersion medium, and washing, drying and disintegrating the same.

10. Method for the preparation of composite pigments which comprises mixing aggregated particles of primary pigments with those of secondary pigments in a single aqueous medium while simultaneously dispersing the said particles in the said medium by means of a small amount of a single dispersing agent, separating any aggregated undispersed pigment particles from the resulting dispersion of finely-divided non-aggregated pigment particles, adding to the separated dispersion a coagulating agent, separating the coflocculated composite pigment from the dispersion medium and washing, drying and disintegrating the same.

11. Method for the preparation of composite titanium dioxide pigments which comprises mixing aggregated particles of titanium dioxide with those of secondary pigments in a single aqueous medium while simultaneously dispersing the said particles in the said medium by means of a small amount of a single dispersing agent, separating any aggregated undispersed pigment particles from the resulting dispersion of finely-divided non-aggregated pigment particles, adding to the separated dispersion a coagulating agent, separating the coflocculated composite titanium dioxide pigment from the dispersion medium and washing, drying and disintegrating the same.

12. Method for the preparation of composite zinc sulfide pigments which comprises mixing aggregated particles of zinc sulfide with those of secondary pigments in a single aqueous medium while simultaneously dispersing the said particles in the said medium by means of a small amount of a single dispersing agent, separating any aggregated undispersed pigment particles from the resulting dispersion of finely-divided non-aggregated pigment particles, adding to the separated dispersion a coagulating agent, separating the coflocculated composite zinc sulfide pigment from the dispersion medium and washing, drying and disintegrating the same.

HUGH V. ALESSANDRONI.